Jan. 5, 1926.
H. T. NEWBIGIN
1,568,908
THRUST BEARING OR THE LIKE
Filed April 4, 1924
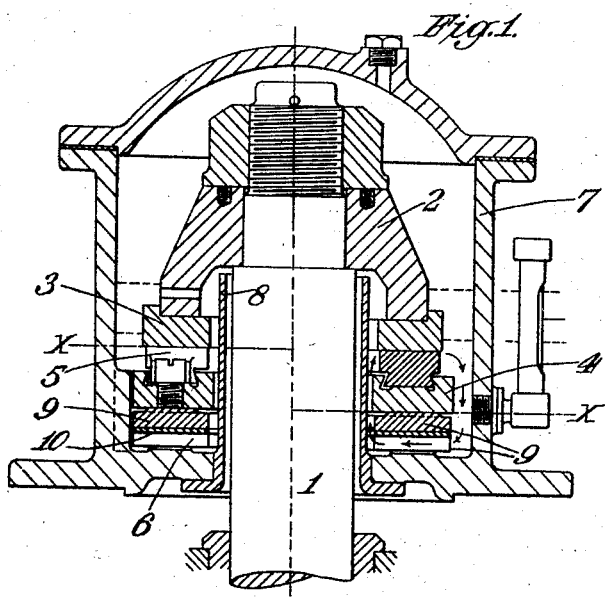
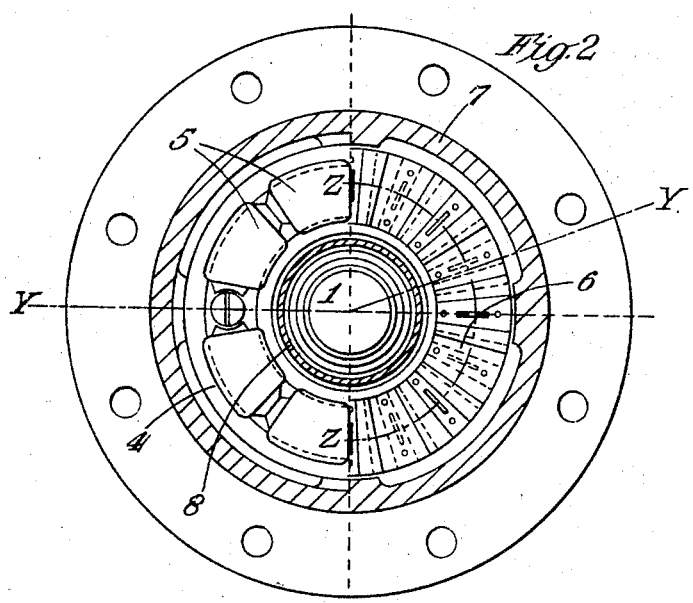
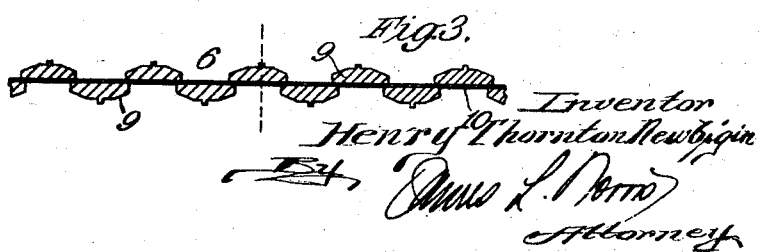
Inventor
Henry Thornton Newbigin
By
Attorney Patented Jan. 5, 1926.

1,568,908

UNITED STATES PATENT OFFICE.

HENRY THORNTON NEWBIGIN, OF NEWCASTLE-ON-TYNE, ENGLAND, ASSIGNOR TO MICHELL BEARINGS LIMITED, OF LONDON, ENGLAND.

THRUST BEARING OR THE LIKE.

Application filed April 4, 1924. Serial No. 704,215.

*To all whom it may concern:*

Be it known that I, HENRY THORNTON NEWBIGIN, a subject of the King of Great Britain, residing in Newcastle-on-Tyne, England, have invented certain new and useful Improvements Relating to Thrust Bearings or the like, of which the following is a specification.

In ball and roller thrust bearings, and in pivoted thrust bearings in which the bearing segments or blocks co-operating with a collar on a shaft, are contained in a rigid carrying member supported by a fixed abutment, it is important to secure equal distribution of the axial load over the bearing elements by compensating for inaccuracies of workmanship in the fixed abutment and its distortion under load.

One known method of providing for such compensation is to mount the carrying member upon a spherical seat. Another method, which has been previously proposed for thrust bearings comprising race rings carrying anti-friction elements and supported within supporting seats bearing against yieldingly pressed abutment members, consists in arranging between each race ring and its supporting seat an annular row of interengaging fulcrum or levelling blocks. Other known methods are to mount the carrying member upon a resilient substance such as rubber, or upon springs.

The present invention consists in placing between a fixed abutment and a rigid member carrying the bearing elements a self-contained deformable device that automatically aligns the surface of the bearing to the plane of rotation of the collar and thus equalizes the pressure upon the bearing elements, the device having the form of a washer made up of a series of pressure equalizing members attached to opposite sides of a flexible diaphragm, the said memebrs being so formed or arranged that they can tilt and the washer flex.

In pivoted bearings of the Michell type this method of construction has the advantage of providing radial passages between the equalizing members through which the oil can have access behind the carrying member to the inner circumference of the collar and so supply the lubricant in the most advantageous manner.

To enable the invention to be understood it will be described with reference to the accompanying drawing, where it is shown as applied to a vertical thrust bearing of the Michell type.

Fig. 1 is a vertical section on the line Y—Y of Fig. 2.

Fig. 2 is a horizontal section on the line X—X of Fig. 1.

Fig. 3 is an extended section on the line Z—Z of the self-contained aligning device 6 shown in half plan on Fig. 2.

The general construction of the bearing consists of a vertical shaft 1, to which a collar 2 is secured, carrying a working face 3, working upon a Michell thrust bearing consisting of a rigid containing ring 4 and pivoted pads 5, all contained in an oil chamber 7 and an oil retaining sleeve 8, and all being of known construction.

The self-contained aligning device 6, which is the special feature of the invention, consists of a flexible diaphragm 10 in Fig. 3, to which the pressure equalizing members 9 are attached. The equalizing members 9 are segmental in plan view, and attached to opposite sides of the diaphragm 10 (by rivets or spot welding), so that their edges slightly overlap. The effect of the arrangement is to compensate for any slight obliquity of the inner supporting surface of the casing 7 to the plane of rotation of the shaft, and so ensure that the thrust bearing reacts equally to the load imposed by the working face 3.

In order to understand the operation of the aligning device, assume the diaphragm 10 to be omitted, then it is obvious that to the extent that any segment 9 is depressed the adjacent segments must rise, thus securing an equalization of the load in a circumferential series of such segments.

The diaphragm to which the segments are attached being flexible by reason of its thinness does not interfere with the functioning of the equalizing members within the range of self-alignment desired and forms a convenient and simple method of locating them thereby forming a self-contained aligning device instead of a number of loose pieces.

Where required it may be made in halves by simply cutting the diaphragm.

The construction lends itself to cheapness of manufacture by facilitating the standardization of the parts.

The construction also provides a number of ports through which the oil thrown out by the rotation of the working face 3 is free to return to the oil retaining sleeve 8 and so upwards to the inner edges of pads 5 as indicated by the arrows in Fig. 1.

The drawing is an illustration of one method of applying the aligning device, but the invention is not confined to the application shown, it can for example be used in conjunction with horizontal thrust bearings.

Having thus described the nature of the said invention and the best means I know of carrying the same into practical effect, I claim:—

1. In a thrust bearing for a revolving shaft collar, the combination with a fixed abutment, of a circular row of separate rigid bearing elements to co-operate with a shaft collar, a rigid member carrying said bearing elements, a self-contained deformable pressure equalizing device supported directly on the fixed abutment for aligning the bearing elements to the plane of rotation of the collar, said device being located between the fixed abutment and the rigid carrying member and said device comprising a flexible diaphragm and a circumferential series of separate pressure equalizing members attached alternately to opposite sides of said diaphragm thereby forming two circumferential rows, the ends of the members in one row overlapping the ends of the members in the other row, said equalizing members being capable of tilting.

2. In a thrust bearing for a revolving shaft collar, the combination with a fixed abutment, of a circular row of separate rigid bearing elements to co-operate with a shaft collar, a rigid member carrying said bearing elements, a self-contained deformable pressure equalizing device supported directly on the fixed abutment for aligning the bearing elements to the plane of rotation of the collar, said device being located between the said abutment and the rigid carrying member and said device comprising a flexible diaphragm and a circumferential series of separate pressure equalizing members attached alternately to opposite sides of said diaphragm, thereby forming two circumferential rows, the ends of the members in one row overlapping the ends of the members in the other row, said equalizing members being capable of tilting and being spaced apart one from another to form radial passages.

In testimony whereof I have signed my name to this specification.

HENRY THORNTON NEWBIGIN.